United States Patent [19]

Stratynski et al.

[11] 4,227,412
[45] Oct. 14, 1980

[54] TEMPERATURE RESPONSIVE ACTUATOR

[75] Inventors: Eugene Stratynski, West Chicago; Charles Zilic, Mt. Prospect, both of Ill.

[73] Assignee: Eaton Corporation, Cleveland, Ohio

[21] Appl. No.: 30,596

[22] Filed: Apr. 16, 1979

[51] Int. Cl.³ ............................................. G01K 5/32
[52] U.S. Cl. ................................................ 73/368.3
[58] Field of Search ..................................... 73/368.3

[56] References Cited

U.S. PATENT DOCUMENTS

| | | | |
|---|---|---|---|
| 2,806,376 | 9/1957 | Wood | 73/368.3 |
| 2,835,634 | 5/1958 | Vernet et al. | 73/368.3 X |
| 2,994,223 | 8/1961 | Woods | 73/368 |
| 3,307,403 | 3/1967 | Bernett | 73/368.3 |
| 3,308,668 | 3/1967 | Wong | 73/368.3 |
| 3,403,559 | 10/1968 | Janous | 73/368.3 |
| 3,407,663 | 10/1968 | Vernet | 73/368.3 X |

*Primary Examiner*—Daniel M. Yasich
*Attorney, Agent, or Firm*—R. J. McCloskey; R. A. Johnston; E. C. Crist

[57] ABSTRACT

A thermal actuator of the expansible wax type is disclosed having an actuator rod extending through an enlarged clearance hole in an upper guide casing, a closely fitting hole in a guide washer, and a snugly fitting anti-chafe ring. The washer and ring are located intermediate the upper surface of a flexible diaphragm and a counterbore defined by the guide casing. The clearance between the outer diameter of the guide washer and the counterbore formed by the guide casing is substantially less than the clearance between the guide casing opening and the actuator rod. The guide washer and anti-chafe ring mounting arrangement in relation to the guide casing opening provides improved rod alignment and a self-cleaning action as the rod moves.

7 Claims, 2 Drawing Figures

TEMPERATURE RESPONSIVE ACTUATOR

BACKGROUND OF THE INVENTION

This invention relates to thermal actuators or temperature responsive force transmitting devices and is particularly directed to devices of this type adapted for use as a component of an automotive cooling system thermostat.

DESCRIPTION OF THE PRIOR ART

Presently known thermal actuators which are widely used in automotive cooling thermostats usually include a flexible rubber diaphragm crimped around its periphery between a cup-shaped base member and an upper guide member. In the more common known construction, a thermally expansible wax base material is located in the base member beneath the flexible diaphragm. In this type construction, an actuator rod is slidably received through an opening in the upper guide member and has its lower end seated in an opening in the diaphragm. An anti-chafing ring is usually provided and is seated in a counterbore in the upper guide member and fits snugly over the actuator rod for preventing the rubber diaphragm from extruding into the opening in the upper guide member. The clearance provided between the outer diameter of the actuator rod and the guide hole in the upper guide is held relatively close to prevent excessive play of the rod and also to prevent the anti-chafe ring from extruding into the guide opening. Diametral clearances between the outer diameter of the actuator rod and the internal diameter of the guide housing opening are typically 0.002 inches (0.051 mm). However, despite such close clearances, prior art valves of this type have been prone to clogging and jamming of the actuator rod at the guide opening caused by a build up of additives, debris, and contaminants present in cooling system fluids. Attempts have been made to alleviate this problem by increasing the clearance at the guide opening. Increasing the clearance has permitted the inner edge of the anti-chafe ring to extrude through and become jammed in the guide opening and also has permitted excessive radial play of the rod.

SUMMARY OF THE INVENTION

In the present invention, a thermal actuator is provided which incorporates an actuator rod extending through a central opening in an upper guide casing. An anti-chafe ring is provided and is spaced from a shoulder formed between a counterbore and guide casing opening. A rigid guide washer is located intermediate the chafe ring and the counterbore. The clearance between the internal diameter of the washer and the outer diameter of the rod is maintained substantially closer than the clearance between the upper guide casing opening and the rod. Radial movement of the rod relative to the guide casing opening is limited by a relatively close fit between the outer periphery of the washer and the counterbore defined by the guide casing. The guide washer performs three unique functions: limiting radial play of the actuator rod, acting as a wiper for scraping off contamination build-up on the actuator rod, and preventing the anti-chafe ring from extruding into the guide casing opening. Since the washer is relatively thin with respect to its outer diameter, only a relatively low force is necessary to scrape contaminants immediately beneath the washer internal diameter and the rod outer diameter, thereby readily permitting movement of the rod without significantly reducing the output force of the actuator. The greater clearance between the guide casing opening and the actuator rod also accommodates contamination build-up on that portion of the rod not scraped clean by the washer.

Accordingly, it is a principal object of this invention to provide a thermal actuator which will function throughout its useful life without jamming.

It is another object of this invention to provide a thermal actuator having a self-cleaning action for wiping contaminant build-up from the actuator rod without significantly reducing the output force generated by the expansible wax material.

It is also an object of the invention to provide a thermal actuator having an increased clearance between the guide housing opening and actuator rod outer diameter while permitting the use of a resilient anti-chafe ring.

These and other objects, features and advantages of the present invention will be understood in greater detail from the following description and the associated drawings.

DETAILED DESCRIPTION

Figures 1, 2:
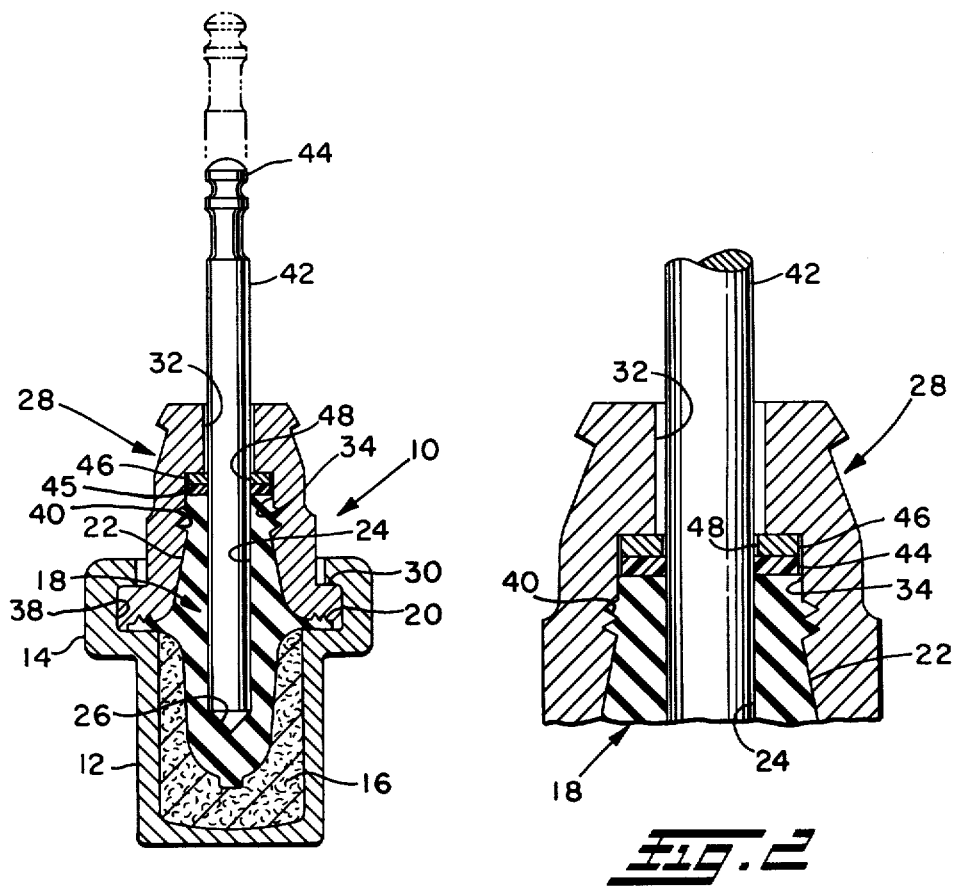
FIG. 1 is a cross-sectional view of the preferred embodiment of the present invention showing the actuator rod position in solid outline at lower temperatures and in dashed outline at elevated temperatures.
FIG. 2 is an enlarged partial cross sectional view of the upper portion of FIG. 1.

Referring now to FIGS. 1 and 2, a thermal actuator, indicated generally by reference numeral 10, includes a housing defined by lower temperature sensing base 12 having a generally cup-shaped configuration and having a flange 14 formed around its upper end. A thermally expansible-contractible fusion type wax material 16 is received in the cup-shaped portion of the base. The wax is contoured along its upper surface to generally match the lower contour of a resilient rubber diaphragm, indicated generally by reference numeral 18. Diaphragm 18, which can be formed of any other suitable resilient sealing material, includes a peripheral bead portion 20, an upper cylindrical neck portion 22, and an opening or well 24 which terminates in a conical end surface 26. The peripheral bead portion spans the open end of cup 12 and registers against the face thereof.

The upper end of the housing is defined by an upper guide casing 28 which includes a lower peripheral flange 30, a centrally located opening or bore 32 through its upper end, a counterbore 34, formed in the lower end of bore 32, and a shoulder 36 intermediate bores 32 and 34. Flange 30 is received in a bore 38 formed in flange 14 and the flange is retained therein by crimping the outer periphery of flange 14 inwardly and over flange 14. The peripheral sealing bead 20 of diaphragm 18 is captured between the opposed surfaces of flanges 14 and 30.

A plurality of axially spaced circumferentially extending grooves 40 are formed in the surface of counterbore 34 and also in the bottom surface of upper housing flange 30. In the presently preferred practice, grooves 40 have a generally V-shaped configuration and function to permit the resilient diaphragm material to extrude therein for effectively sealing the diaphragm at those interfaces.

Actuator rod 42 has its upper end 44 adapted for connection to an associated automotive thermostat component, not shown, and its lower end extending through opening 32 and engaging the bottom 26 of the diaphragm opening 24.

An anti-chafing ring 45 is snugly received over actuator rod 42 and has the bottom face thereof in contact with the upper surface of diaphragm neck 22. Ring 45 may be made of any suitable resilient material having a low surface coefficient of friction. In the preferred form of the invention ring 45 is molded from a polytetrafluoroethylene (PTFE) material having approximately 15% glass fiber fill and functions to inhibit the surface of the diaphragm, near the upper end of opening 24, from chafing or abrading as rod 42 moves relative thereto. The resilience and lubricity inherent in PTFE make it particularly suited for this purpose.

A guide washer 46 has a guide passage 48 provided centrally therein and has rod 42 received therethrough. In the preferred form of the invention, guide passage 48 has the diameter thereof sized to provide a diametral clearance relative to the outer diameter of rod 42 in the range of 0.0003 to 0.0018 inches (0.0076–0.045 mm). The diametral clearance between the outer diameter of rod 42 and opening 32 in the preferred form of the invention is in the range of 0.004–0.005 inches (0.101–0.127 mm), but should be at least 0.003 inches (0.076 mm). The outer diameter of guide washer 46 has a diametral clearance relative to the internal diameter of counterbore 34 substantially less than the clearance between rod 42 and opening 32 such that only a relatively small radial movement of the washer is permitted with respect to the upper casing. Guide washer 46 is preferably formed of a suitable metallic material which is resistant to the corrosive effects of engine cooling system fluids. A material which has been found particularly suited for this environment is A.I.S.I. type 430 stainless steel.

In operation, as the temperature of base 12 rises above a predetermined minimum value, the wax material 16 experiences an expansion which acts against the lower end of rubber diaphragm 18 forcing actuator rod 42 upwardly. The close fit of guide washer 46 relative to actuator 42 prevents anti-chafe ring 45 from moving with rod 42. Furthermore, guide washer 46 provides longitudinal support for anti-chafe ring 45 thereby insuring that its internal wiping edge is maintained in contact with the top surface of diaphragm 18. The close fit of the guide washer over the rod allows the inner edge of guide passage to scrape contamination from the surface of actuator rod 42 as it reciprocates, thus providing a self cleaning action which protects not only the anti-chafe ring but also inhibits jamming of the rod relative to opening 32. Guide washer 46 also substantially limits the radial play of actuator rod 42 relative to upper guide 28, thereby providing relatively precise linear rod movement. The diametral clearance provided between opening 32 and rod 42 is sized an amount sufficient to accommodate the projected contaminant or additive build up which might occur over the expected useful life of the actuator.

It will be understood by those having ordinary skill in the art that modifications and variations of the invention may be made without departing from the scope of the invention which is more particularly described in the following claims.

What is claimed is:

1. A temperature responsive actuator, comprising:
   (a) housing means defining a cavity, said housing means including a cup-shaped base member and a guide casing connected to said base member, said guide casing having a first opening formed therethrough and a registration surface provided within said cavity adjacent said first opening;
   (b) a flexible diaphragm disposed within said cavity and sealingly connected around the outer periphery thereof to said housing means;
   (c) thermally expansible material received in said cavity intermediate said base member and said diaphragm;
   (d) an elongated actuator member having one end received through said first opening in said guide casing and operably connected to said diaphragm for movement therewith, said actuator member having an outer diameter sized to define a first clearance with said opening in said guide casing;
   (e) an anti-chafe member having an opening therethrough with said actuator member slidably received therethrough, said member having surface portions thereof in abutment with said diaphragm; and
   (f) a rigid support washer having a central guide passage therethrough, said washer having said actuator rod slidably received therethrough, actuator rod outer diameter defining with said guide passage a second clearance substantially less than said first clearance, said washer having face portions thereof in abutment with said anti-chafe member and said guide casing, said washer having the outer periphery thereof defining with said registration surface a third clearance substantially less than said first clearance to permit a predetermined amount of radial movement thereof, wherein said washer substantially limits the radial play of said actuator member relative to said first opening in said guide casing and wipes contaminant build-up from portions of the periphery of said actuator member, said washer providing axial support for said anti-chafe ring, said second and third clearance surfaces sized to prevent said actuator member from contacting the inner periphery of said first opening.

2. The device as defined in claim 1, wherein,
   (a) said guide casing includes a shoulder located intermediate said first opening in said counterbore;
   (b) said guide washer has the upper surface thereof in abutment with said shoulder.

3. The device as defined in claim 1, wherein said first clearance is in the range of 0.004 to 0.005 inches (0.101 to 0.127 mm).

4. The device as defined in claim 1, wherein said second clearance is in the range of 0.0003 to 0.0018 inches (0.0076 to 0.045 mm).

5. The device as defined in claim 1, wherein,
   (a) said anti-chafe ring is formed of 15% glass filled polytetrafluoroethylene; and
   (b) said guide washer is formed of stainless steel.

6. The device as defined in claim 1, wherein,
   (a) said first clearance is in the range of 0.004 to 0.005 inches (0.100 to 0.127 mm); and
   (b) said second clearance is in the range of 0.003 to 0.0018 inches (0.0076 to 0.045 mm).

7. The device as defined in claim 1, wherein said first clearance is at least 0.003 inches (0.076 mm).